UNITED STATES PATENT OFFICE.

CHRISTINE M. FABEL, OF OCEANPARK HEIGHTS, CALIFORNIA.

COMPOSITION FOR PIE-CRUST OR THE LIKE.

1,103,355.

Specification of Letters Patent. Patented July 14, 1914.

No Drawing.

Application filed May 31, 1913. Serial No. 771,090.

*To all whom it may concern:*

Be it known that I, CHRISTINE M. FABEL, a subject of the Emperor of Germany, residing at Oceanpark Heights, in the county of Los Angeles and State of California, have invented a new and useful Composition for Pie-Crust or the like, of which the following is a specification.

My invention relates to a composition for pie crust or the like, and the main object of my invention is to produce a composition of matter of the class described having a fixed or stable nature which may be prepared in large quantities and distributed to the consumer through the ordinary channels of trade, namely, through grocery stores and the like, in a raw state, and which will keep in such state fresh, sweet and white for a great length of time, and which upon the addition of water and being baked produces a wholesome article of diet, namely, pie crust. As far as I am able to ascertain there has never been produced a composition of this character which could be handled as is ordinarily done with common forms of merchandise, for the reason that pie crust composition as commonly made must be used and baked shortly after being made, otherwise it becomes stale, yellow and unwholesome in a very short time. It is therefore desirable to produce a pie crust composition which may be bought by the consumer ready for converting into dough for making pies and the like without the consumer having to carefully mix the ingredients and prepare the same, which not only takes considerable time, but also requires considerable skill in the production of a dough which produces good pie crust.

In the ordinary methods of producing pie crust dough, flour is used, to which shortening, such as lard or animal fats, is added, and in a short time the lard becomes rancid and the flour becomes molded, but in the pie crust composition which I have produced neither of the above undesirable actions occurs. I am also aware that ordinarily baking powder or baking soda together with salt is used, but these ingredients do not prevent the lard from becoming rancid or the flour from molding.

In producing a pie crust composition I take the following ingredients in approximately the proportions given, as follows: flour 3 lbs., salt 1½ ozs., cornstarch ¼ oz., and cream of tartar 1½ oz. These I mix thoroughly in the dry state and then take the mixture so produced and work the same up with about 20 ozs. of lard or shortening until a composition which has a flaky or crummy appearance is produced, it then being in the condition fit for packing in suitable receptacles for distribution to the trade. By including the cornstarch I find that a smoother composition is produced, but I do not consider that this ingredient is material for other purposes. The composition so produced I have discovered may be kept for a long period of time both sweet and white, in fact such a composition I have discovered produces best results when made into pie crust after having been kept for three or four months.

I desire to call particular attention to the presence in the composition of the cream of tartar and to this ingredient I attribute the good results therein obtained, such as the life of the composition in its sweet, white and wholesome condition, due I believe to preservative action of the cream of tartar on the fats.

By making a pie crust composition, as above set forth, I produce a new article of food stuffs which may be put up in marketable form and handled by the trade to consumers. It is to be understood that when it is desired to use the composition for pie-making, or the like, the composition is mixed into a dough by mixing the same with water, and shaped in pans or other suitable vessels to receive the pie body or filling, after which the same is placed in an oven and baked into crust. I also find that it is practicable to mix part of the constituents in the quantities given using only the lard with the cream of tartar, either with or without the salt, and the composition so produced will also keep for long periods without becoming rancid. When it is desired to produce pie crust, or the like, this treated lard may be combined with the remaining constituents or others as desired.

I claim as my invention:

A composition of matter consisting of flour forty-eight parts, salt one and one-half parts, cornstarch one-fourth part, cream of tartar one and one-half parts, and lard twenty parts, these portions being determined by weight.

In testimony whereof, I have hereunto set my hand at Los Angeles, California, this 23rd day of May, 1913.

CHRISTINE M. FABEL.

In presence of—
FRED A. MANSFIELD,
F. W. HARRIS.